July 7, 1959     E. A. RICHARDSON     2,893,703
COOLING AND SUPPORTING STRUCTURE
Original Filed Dec. 12, 1947
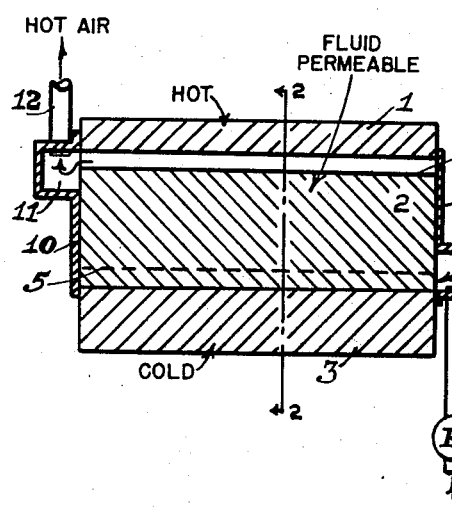
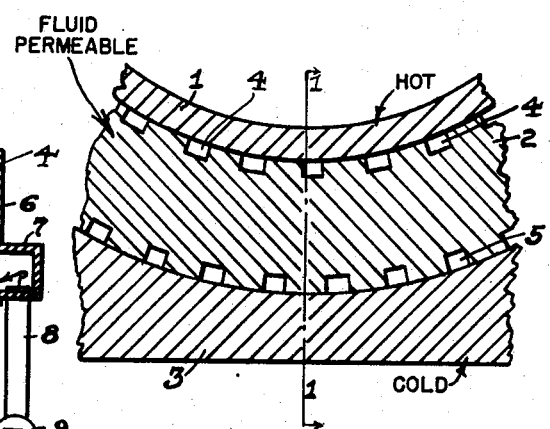
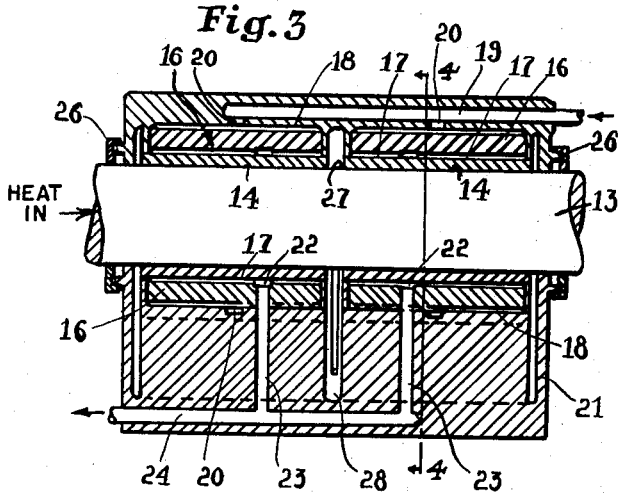
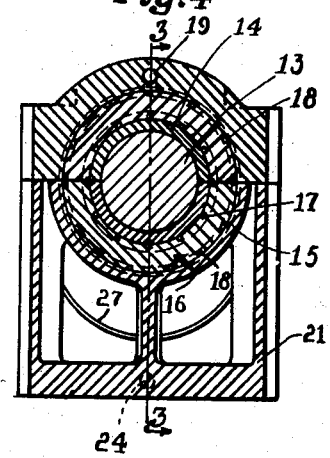
Inventor
EDWARD ADAMS RICHARDSON
Attorneys

United States Patent Office 2,893,703
Patented July 7, 1959

2,893,703

COOLING AND SUPPORTING STRUCTURE

Edward Adams Richardson, Bethlehem, Pa.

Original application December 12, 1947, Serial No. 791,200, now Patent No. 2,774,566, dated December 18, 1956. Divided and this application September 20, 1956, Serial No. 611,048

4 Claims. (Cl. 257—250)

This invention relates to a cooling and supporting structure. More particularly it relates to a method and apparatus for the transfer of heat involving the use of material which is permeable to fluids.

The problem of reducing and controlling the temperature of certain structural parts such as bearings, cylinder walls, valves and gas turbine blades is constantly under attack. With the rapid increase in the use of gas turbines, jet and other types of engines involving the occurrence of very high temperatures, the need for greatly improved means of reducing the temperature of such structural parts has become imperative due to the effective temperature limits of known lubricants and the inability of many metals and alloys thereof to perform satisfactorily under the high temperatures required.

It is, therefore, an object of this invention to provide a method and apparatus whereby achievements of efficient cooling and temperature control of material parts subjected to heat and in particular high heat is possible.

An additional object of this invention is to provide means for cooling structural parts which are subjected to heavy loads.

These and other objects will become apparent from the description.

Briefly the present invention involves the use of fluid permeable materials having good thermal conductivity in conjunction with a fluid. The permeable materials act to conduct heat from a hot structural part, to transfer the heat to a cooling fluid and in some measure also to a colder surrounding structure. It is generally applicable to the controlled cooling of structural parts which support a heavy load since the permeable material is such that it can contribute to the overall structural strength.

An important aspect of the invention is the use of permeable bodies having large surface areas per unit of volume or mass which the fluid used may contact combined with a relatively low permeability. Such a body is readily formed by the use of fine mesh particles and closely approaches the desideratum of having all of the fluid being in substantial contact with the solid, the distances for heat flow being made extremely short through the thinness of the individual fluid streams passing through the permeable body.

Whereas most heat exchangers depend upon turbulent flow in which the pressure drop increases nearly as the square of the mass rate of flow, the use of permeable bodies results in a fluid flow which is substantially laminar so that the pressure drop is substantially as the first power of the fluid mass flowing. In general, less power is required for securing the transfer of heat because of this law, while the characteristic curve of power required is more favorable for operation and control.

It will be apparent that wide variations of permeabilities will be used in the embodiments of this invention due to having to compromise at times with other factors such as relative uniformity and rate of flow, strength of material, the ability to pick up heat from another body, and the object to be attained. Generally speaking, permeability is measured in terms of the number of cubic feet of air of an assigned initial temperature such as 70° F. flowing in one hour through each superficial square foot of surface when the pressure drop of the air is one foot of water pressure per foot of permeable body thickness. Such permeabilities may be at least as great as 14 for heat transfer devices to as low as, or even much lower than 0.006 for such fabrications as gas turbine blades.

Where a permeable body is used for maintaining one temperature on a cold surface and another temperature on a hot surface, the following formula is characteristic:

$$G \cdot h = \int_{Tc}^{Th} \frac{K}{Q} \cdot dT$$

where $$Q = \int_{Tf}^{T} Cp \cdot dT$$

G is rate of fluid flow;
H is the thickness of the permeable material;
Th is the hot surface temperature;
Tc is the cold surface temperature;
K is the conductivity of the solid and contained fluid. In general the solid free of fluid, and the fluid alone as though stationary, are considered to conduct in parallel in determining K at any point.

T is any inner temperature at a distance $x$ from the cold surface;
Tf is the temperature of the entering fluid;
Cp is the thermal capacity of the entering fluid.

This formula assumes a not too high rate of flow and a permeability such that the difference of temperature, at the distance $x$, between solid and fluid is of the order of a small fraction of a degree Fahrenheit.

In the design of a particular cooling structure, other factors must be considered. The required strength of the structure, the available pumping pressure, the available space and other factors depending on the specific problem are all involved.

Fluid permeable bodies of non-metallic substances suitable for use within the scope of this invention are well known in the art. Examples are bodies formed by bonding variously particles of graphite, carborundum or quartz. Although developed comparatively recently, the manufacture of permeable metal bodies suitable for use in this invention is equally well known. Such bodies are used particularly in the production of filters and clutch plates.

In the production of filters a sintered powdered compact of bronze is commonly used. With a bronze compact, compressive strengths up to 16,000 pounds per square inch may be obtained. A wide range of permeabilities may be obtained by control of the mesh size of the metal particles. Since temperature as high as about 350° F. in an oxygen atmosphere and 900° F. in an atmosphere without oxygen may be applied to copper alloys without progressive building up of oxide and destruction of the permeable bodies, it will be apparent that permeable bodies such as those used in the filter art are well adapted to being used in this invention.

Variously by the use of different alloys, mixtures of principal alloy particles and bonding alloy particles such as copper, heat treatment and greater compaction pressures other even stronger permeable structures have been obtained. Thus an 0.87 percent carbon iron powder and copper bond powder has been pressed, sintered, repressed and resintered to give a body having a compressive strength of 85,000 pounds per square inch. Heat treating this compact results in a compressive strength of 150,000 pounds per square inch.

Infiltrant alloys in sintered compacts may be, for example, aluminum bronze with a relatively high melting point, high resistance to oxidation up to about 1000° Fahrenheit, and high strength, Everdur, beryllium-copper, copper-nickel, also copper-nickel-zinc alloys. The copper-nickel alloys are self-protecting against oxidation to 700° Fahrenheit; in addition, many have good resistance to creep up to moderately high temperatures. Even coin and sterling silver as well as gold alloys are valuable where chemical action must be resisted up to perhaps as high as 400° to 600° Fahrenheit. Titanium hydride has been used in compacts to secure a protective alloy surface on the base powder used in the compact. These are but a few of the materials readily available for metal bonding and surface protection.

The control of permeability is secured largely through particle size control and to a less extent through compaction under pressure and the degree of heating during sintering. Final control may be had by passing weak solutions, having a slight solvent action on the compact material, through said compacts to secure the desired permeability within close limits, when the sintered permeability is on the low side. Similarly a weak solution able to deposit metal or non-metallic filler, or colloidal body in the pores may be used to bring the permeability down from too high values. Chemical or electrolytic deposition is possible. Such methods may be used for other purposes such as producing a chemically resistant plate or the establishment of a catalytic material in the pores of the permeable body.

Reference may be made to the following for additional information on fluid permeable materials:

"Design of Powdered Metal Parts," by W. H. Arata in "Product Engineering," vol. XV, No. 8, August 1944, published by McGraw-Hill Publishing Company, Inc., 330 W. 42nd Street, New York 18, N.Y.

"Improved Engineering Properties of Parts Made from Iron Powders," by Claus G. Goetzel in "Product Engineering," Vol. 18, No. 8, August 1947, published by McGraw-Hill Publishing Company, Inc., 330 W. 42nd Street, New York 18, N.Y.

"Powder Metallurgy, a Symposium," edited by John Wulff, published by The American Society for Metals, Cleveland, Ohio, 1942.

Other forms of permeable material may be utilized equally well in many applications of the invention provided the permeability is relatively low, the heat conductivity is good and the surface of elements per unit of volume is relatively large. Bodies formed of wire-like or needle-like particles with their axes substantially parallel to each other and to the heat flow and normal to the direction of fluid flow may be used in heat exchangers. In some cases it is practical to use sheet elements having permeability secured by scratching one side of each sheet so that the scratches of one sheet and the relatively smooth surface of an adjacent sheet shall produce the necessary fine passages on bonding the sheets. In general, all bodies used should have reasonably high inherent strength.

It will be apparent that there exists a wide selection of known materials which may be used in this invention. The qualities of strength, ability to stand up under high heat, permeability and heat conductivity may obviously be combined in an infinite number of combinations depending on the characteristics required.

A wide range of fluids may be used in connection with the permeable material. Air and other gases, air or other gas carrying a fog of liquid particles in suspension such as water droplets and water are examples. In most cases the fluids should be properly cleaned so as not to clog the pores through deposition of suspended solids, precipitants or the like. Where fluids may generate solid cracking products, as on heating, such fluids should be avoided or adequate means for cleaning the permeable body at regular intervals should be provided. Preferably they will be non-corrosive and will not dissolve the permeable material.

For some purposes, a gas such as air into which a heavy fog of liquid particles has been introduced will have valuable properties in respect to average density and more particularly heat capacity involving therein the heat absorption on evaporation of the liquid drops.

In the drawings:

Figure 1 is a vertical cross section of a portion of a bearing and its supporting members;

Figure 2 is a section taken on a plane indicated at 2—2 in Figure 1;

Figure 3 is a longitudinal vertical section of a ring oiler pillow block carrying a shaft;

Figure 4 is a section taken on a plane indicated at 4—4 in Figure 3.

In Figures 1 and 2 a bearing 1 is supported by a member 2 which in turn is supported by a member 3. The member 2 is constructed of a fluid permeable metal having good thermal conductivity and has transverse grooves 4 in its inner face and transverse grooves 5 in its outer face.

A pump 9 through pipe 8 supplies a cool fluid, for example, air, under pressure to a chamber 7 into which the grooves 5 open. A plate 10 abuts against the members 2 and 3 and seals the other ends of the grooves 5. Thus the cool fluid is confined within the grooves 5 except to the extent it can flow through the permeable member 2 into the grooves 4.

One end of each of the grooves 4 is sealed by a plate 6 which abuts against the bearing 1 which may be, for example, bronze, and the permeable member 2. The other ends of the groove 4 open into a chamber 11 which has an outlet pipe 12. Thus the fluid on reaching the grooves 4 will flow to chamber 11 and be exhausted through the pipe 12.

The member 2 having good thermal conductivity and being in surface to surface contact with the outer surface of bearing 1 will provide for a ready transfer of heat from the bearing to itself. Being permeable, it obviously has a vast heat transfer surface per unit of volume. Further, the air which is forced through the permeable member is broken down into innumerable streams, minute in magnitude. I, therefore, have the heat of the bearing transferred to surfaces very great in sum where it is transferred to minute streams of air. Thus it will be apparent that very efficient use of space and volume of fluid is achieved. The large amount of heat removed lowers the temperature of bearing 1, as well as that of the lubricating film in contact therewith, to values suited to said lubricant being used. Obviously the permeability required and the air flow will be adapted to securing this result.

Some heat will also be transferred from the bearing to the supporting member 3 (though this heat flow becomes negligible at even moderate rates of fluid flow) through the permeable member 2 and also to the air as it flows over the surface of the bearing when it is in grooves 4 enroute to chamber 7.

It will be apparent that the strength of material required to support the bearing, the temperature of the bearing without any cooling and the temperature at which it is desired to maintain it, are factors which govern the selection of the permeable material.

In Figure 3, a bearing mounting 21 for use with a shaft subjected to high heat such as, for example, the shaft of an exhaust draft fan in a boiler plant is shown. A shaft 13 is surrounded by bearing shells 14 of bronze which are secured to a pillow block 15. Inserted in cutout portions of the pillow block are permeable metal bands 16. Longitudinal grooves 17 are located in the faces of metal bands 16 which are adjacent the bearing shells 14. Similar grooves 18 are cut into the opposite faces of the metal bands.

A cooling fluid is pumped to chamber 19 and through the circumferential grooves 20 reaches grooves 18. Since the ends of grooves 18 abut against the pillow block, the fluid must pass through the permeable bands 16 to grooves 17 whose ends likewise abut against the pillow block. Circumferential grooves 22 and connected passages 23 and 24 provide an exhaust path for the fluid from the grooves 17.

In the case of an exhaust draft fan, passage 24 may be connected to the low pressure side of said exhaust draft fan so that the difference between atmospheric and suction pressures may produce the desired fluid flow.

The bearing mounting in addition has conventional packing glands 26, an oiler ring 27 and an oil chamber 28. The high heat of shaft 13 is transferred to bearing shells 14 which, in turn, transfer it readily to the permeable bands 16. Obviously as the rate of heat removal from bearing 14 is increased, the temperature of 13, 14, and all other parts is lowered so that at an appropriate rate of fluid flow, the desired temperature in bearing 14 is attained. As in the previous illustration, the heat in these bands is very efficiently transferred to the cooling fluid.

In view of the methods described, it should be obvious that the cooling of engine cylinders, for example, would be substantially shown in Figs. 3 and 4 if shaft 13 is replaced with hot cylinder gases and the lubricating means are replaced and the channels thereof to the shaft are closed. Since both the permeability and the thickness of the permeable body may be locally modified, increased cooling may be attained readily at exhaust valve seats, cylinder heads, and other hot spots, a result not readily secured by other methods of cooling. Obviously a further advantage of this method of cooling is securable in the case of engine cylinders and other pressure vessels in that the permeable body may be separated from the heat source by a shell, such as the shell 1 of Figs. 1 and 2 barely thick enough to take the wear and corrosion expected and allow a small amount for the bridging of the widths of channels such as the channels 4 of Figs. 1 and 2, with safety. Virtually the whole hoop strength can be placed in thin walls such as member 3 which are at substantially constant temperature differing little from atmospheric throughout the length and thickness thereof.

It is not desired to be limited except as set forth in the following claims.

This application is a division of application Serial No. 791,200, filed December 12, 1947, now Patent No. 2,774,-566 granted December 18, 1956.

What is claimed is:

1. In combination, a structural part subject to heating, a body of fluid permeable material of good thermal conductivity abutting said structural part and forming with said structural part a common interface, said permeable body having a face opposite said interface, means to introduce a cooling fluid under pressure to said face opposite the interface, means to exhaust the cooling fluid from the interface including passages in the interface whereby the cooling fluid flows through the permeable body in the direction from the face opposite the interface to the interface to provide a substantially uniform cooling of the permeable body and the structural part.

2. In combination, a structural part subject to heating, a body of fluid permeable sintered material of good thermal conductivity abutting said structural part and forming with said structural part a common interface, said permeable body having a face opposite said interface, means to introduce a cooling fluid under pressure to said face opposite the interface, means to exhaust the cooling fluid from the interface including passages in the interface whereby the cooling fluid flows through the permeable body in the direction from the face opposite the interface to the interface to provide a substantially uniform cooling of the permeable body and the structural part.

3. In combination, a structural part subject to heating, a support for said part formed of fluid permeable material having high compressive strength abutting said structural part and forming with said structural part a common interface, said support having a face opposite said interface, means to introduce a cooling fluid under pressure to said face opposite the interface, means to exhaust the cooling fluid from the interface including passages in the interface whereby the cooling fluid flows through the support in the direction from the face opposite the interface to the interface to provide a substantially uniform cooling of the support and the structural part.

4. In combination, a heated liner, an enclosing body of fluid permeable material of good thermal conductivity abutting said heated liner and forming with said heated liner a common interface, said permeable body having a face opposite said interface, means to introduce a cooling fluid under pressure to said face opposite the interface, means to exhaust the cooling fluid from the interface including passages in the interface whereby the cooling fluid flows through the permeable body in the direction from the face opposite the interface to the interface to provide a substantially uniform cooling of the permeable body and the liner.

References Cited in the file of this patent

UNITED STATES PATENTS

| | | |
|---|---|---|
| 1,285,916 | Bradburn et al. | Nov. 12, 1918 |
| 1,634,768 | Bonner | July 5, 1927 |
| 2,571,868 | Haller | Oct. 16, 1951 |
| 2,696,410 | Topanelian | Dec. 7, 1954 |
| 2,756,115 | Michel | July 24, 1956 |